UNITED STATES PATENT OFFICE.

GADIENT ENGI AND JAROSLAV FRÖHLICH, OF BASEL, SWITZERLAND, ASSIGNORS TO SOCIETY OF CHEMICAL INDUSTRY IN BASLE, OF BASEL, SWITZERLAND.

HALOGENIZED VAT DYESTUFFS AND PROCESS OF MAKING SAME.

997,766. Specification of Letters Patent. Patented July 11, 1911.

No Drawing. Application filed April 24, 1911. Serial No. 623,006.

*To all whom it may concern:*

Be it known that we, GADIENT ENGI, doctor of philosophy and chemist, a citizen of the Swiss Republic, and JAROSLAV FRÖHLICH, doctor of philosophy and chemist, a subject of the Emperor of Austria-Hungary, residents of Basel, Switzerland, have invented new and useful Halogenized Vat Dyestuffs and a Process of Making Same, of which the following is a full, clear, and exact specification.

In the specification of our application for Letters Patent, filed December 28th 1910, we have described the manufacture of new colored condensation products by treating an indigo substance with a halid of an acid of the aromatic series, in the presence of a condensing agent, the said condensing products possessing the valuable property of yielding on treatment with reducing agents, leuco compounds soluble in alkalis and dyeing vegetable and animal fibers in an alkaline vat beautiful yellow tints of excellent fastness. According to the present invention these condensation products can be transformed by treatment with halogens or substances yielding halogens, into new halogenized derivatives, also constituting valuable dyestuffs dyeing in a vat but distinguished from the parent products of condensation in that they furnish, generally speaking, purer and in part much redder tints, and possess a greater affinity, particularly for vegetable fibers.

The invention is illustrated by the following examples, the parts being by weight:

Example I: 10 parts of the dyestuff obtained in accordance with Example I of the aforesaid specification by action of benzoyl chlorid on indigo, are mixed with 50 parts of nitrobenzene and 15–20 parts of bromin and the mixture is first stirred for about 4 hours at the ordinary temperature; it is then heated on the oil bath for 3–5 hours at 170–175° C. When the mass has been cooled the brominated product which has separated is filtered, washed with alcohol or steamed for the purpose of eliminating adherent nitrobenzene, and dried.

The new dyestuff is a yellow crystalline powder containing about 33 per cent. of bromin. In concentrated sulfuric acid it dissolves to a brown-red solution; when the solution is diluted the dyestuff is precipitated as yellow flocks. Sulfuric acid containing 24 per cent. of sulfuric anhydrid dissolves the dyestuff to an intense bluish red solution. With alkaline reducing agents the dyestuff yields a wine-red vat which dyes vegetable and animal fibers pure yellow tints of excellent fastness and much more reddish than those obtained with the dyestuff used as parent material.

Example II: Into a mixture of 125 parts of concentrated sulfuric acid and 10 parts of bromin, there are introduced 5 parts of the dyestuff obtained according to Example I of the aforesaid specification, care being taken to stir well; stirring is continued for 15–20 hours at the ordinary temperature (15–20° C.). The mass is then poured into water, the whole filtered and the solid matter washed until the washings are neutral. The dyestuff paste thus produced may be dried or used as such for dyeing or printing. The brominated dyestuff, thus prepared, dissolves in fuming sulfuric acid to a brown-red solution and yields on textile fibers yellow tints a little less greenish than those obtained with the bromo derivative made according to Example I.

Example III: 20 parts of the product obtained according to Example I of the aforesaid specification are introduced little by little into 150–200 parts of bromin; care being taken to stir well and to cool the mass slightly. The mixture is first stirred for 10 to 12 hours at the ordinary temperature, then heated in the course of 2–3 hours to gentle boiling in a reflux apparatus and maintained for 10–15 hours at the boiling point of bromin. The excess of bromin is then separated by distillation, the residue is treated with a dilute solution of sodium bisulfite, the liquid filtered and the solid washed with hot water. The brominated dyestuff thus obtained has properties analogous to those of the brominated product made in accordance with Example I.

Example IV: 20 parts of the condensation product from indigo and benzoyl chlorid, made in accordance with the aforesaid specification, are suspended in 100 parts of nitrobenzene and into the mixture is introduced during about 15 minutes a moderately strong current of chlorin, care being taken to stir and to cool with ice; the current of chlorin is continued until there is an increase of weight amounting to about 12 parts. The chlorin is then stopped and the mixture is stirred first for 12 to 15 hours while cooling externally and then for 10–15 hours at the ordinary temperature. The product which has separated is isolated in the usual manner by filtration and washing, whereupon it constitutes a clear yellow crystalline powder containing some 14–16 per cent. of chlorin; it dyes cotton and wool in an alkaline vat yellow tints more reddish than those obtained with the dyestuff used as the parent material.

If in the preceding example a larger proportion of bromin or chlorin is used, or if the operation is conducted at a higher temperature, if necessary under pressure and with aid of a carrier of halogen, more highly brominated or chlorinated products are obtained.

Instead of the diluents used in the examples, other suitable solvents or diluents may be used, such as for example glacial acetic acid, carbon bisulfid, carbon tetrachlorid, pentachlorethane, dichlorobenzene, sulfuryl chlorid, chlorosulfonic acid, or fuming sulfuric acid. When using sulfuric acid, chlorosulfonic acid or fuming sulfuric acid, hydrobromic acid may be used as the brominating agent and may be produced within the mass by introducing a metal bromid such as sodium bromid, for instance.

In an analogous manner other condensation products from indigo and its derivatives obtainable in accordance with the aforesaid specification may be transformed into halogenized derivatives.

Mixed halogenized products may also be made by the process of the present invention by subjecting feebly chlorinated or brominated products to a subsequent bromination or chlorination. The chloro-bromo derivatives thus obtained have properties analogous to those of the derivatives which are brominated or chlorinated in corresponding degree.

What we claim is:

1. The described process for the manufacture of new halogenated yellow vat-dyestuffs which process consists in acting with a halogenating agent on the condensation products obtainable by treating an indigo substance with a halid of an acid of the aromatic series in the presence of a condensing agent.

2. The described process for the manufacture of new halogenized yellow vat-dyestuffs, consisting in acting with a halogenating agent on the condensation products obtained by treating indigo with benzoylchlorid in the presence of a condensing agent.

3. As new products the described halogenated yellow vat-dyestuffs, derived from the hereinbefore defined condensation products of indigo substances and aromatic acid halids, forming in dry state yellow powders, insoluble in water, difficultly soluble in alcohol, more easily soluble in hot nitrobenzene with a yellow color, dissolving in concentrated sulfuric acid with brownish-red color, in fuming sulfuric acid with bluish-red color and yielding by treatment with alkaline reducing agents wine-red to Bordeaux-red solutions, from which vegetable and animal fibers are first dyed in Bordeaux-red to wine-red shades, becoming yellow on exposure to the air, the said yellow shades being fast to washing, light and chlorin.

4. As new articles of manufacture, the described halogenated vat-dyestuffs derived from the hereinbefore defined condensation product of indigo and benzoyl chlorid, forming in dry state yellow powders, insoluble in water, difficultly soluble in alcohol, more easily soluble in hot nitrobenzene with a yellow color, dissolving in concentrated sulfuric acid with brownish-red color, in fuming sulfuric acid with bluish-red color and yielding by treatment with alkaline reducing agents wine-red to Bordeaux-red solutions, from which vegetable and animal fibers are first dyed in Bordeaux-red to wine-red shades, becoming yellow on exposure to the air, the said yellow shades being fast to washing, light and chlorin.

In witness whereof we have signed our names this 7th day of April 1911, in the presence of two subscribing witnesses.

GADIENT ENGI.
JAROSLAV FRÖHLICH.

Witnesses:
GEORGE GIFFORD,
AMAND RITTER.